United States Patent
Tanaka et al.

(10) Patent No.: US 10,920,051 B2
(45) Date of Patent: Feb. 16, 2021

(54) RESIN COMPOSITION AND ELECTRICAL CABLE

(71) Applicant: SUMITOMO ELECTRIC INDUSTRIES, LTD., Osaka (JP)

(72) Inventors: Shigeyuki Tanaka, Osaka (JP); Taro Fujita, Osaka (JP); Shinya Nishikawa, Osaka (JP); Takaya Kohori, Tochigi (JP); Motoi Matsuda, Tochigi (JP); Hiroyuki Okawa, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/494,826

(22) PCT Filed: Dec. 22, 2017

(86) PCT No.: PCT/JP2017/046204
§ 371 (c)(1),
(2) Date: Sep. 17, 2019

(87) PCT Pub. No.: WO2018/193665
PCT Pub. Date: Oct. 25, 2018

(65) Prior Publication Data
US 2020/0277475 A1  Sep. 3, 2020

(30) Foreign Application Priority Data

Apr. 20, 2017 (JP) .................. 2017-083547

(51) Int. Cl.
*C08L 23/06* (2006.01)
*C08L 31/04* (2006.01)
*H01B 3/12* (2006.01)
*H01B 3/44* (2006.01)

(52) U.S. Cl.
CPC .............. *C08L 23/06* (2013.01); *C08L 31/04* (2013.01); *H01B 3/12* (2013.01); *H01B 3/446* (2013.01); *C08L 2201/02* (2013.01); *C08L 2201/08* (2013.01); *C08L 2203/202* (2013.01); *C08L 2207/062* (2013.01)

(58) Field of Classification Search
CPC ...... C08L 23/06; C08L 31/04; C08L 2201/02; C08L 2201/08; C08L 2203/202; C08L 2207/062; H01B 3/12; H01B 3/446
See application file for complete search history.

(56) References Cited

U.S. PATENT DOCUMENTS

| | | | |
|---|---|---|---|
| 2007/0221395 A1 | 9/2007 | Hase et al. | |
| 2010/0233146 A1* | 9/2010 | McDaniel | C09D 5/1625 424/94.2 |
| 2011/0009571 A1* | 1/2011 | Taft | A61P 25/18 525/450 |
| 2011/0240064 A1* | 10/2011 | Wales | C09D 7/65 134/26 |
| 2012/0097194 A1* | 4/2012 | McDaniel | C09D 5/1625 134/26 |

FOREIGN PATENT DOCUMENTS

| | | |
|---|---|---|
| JP | S55-119318 | 9/1980 |
| JP | H7-94039 | 4/1995 |
| JP | H7-330980 | 12/1995 |
| JP | 2005-29790 | 2/2005 |
| JP | 2014-65809 | 4/2014 |
| JP | 2014065809 A * | 4/2014 |
| JP | 2015-164114 | 9/2015 |
| WO | 2005/119705 | 12/2005 |

* cited by examiner

*Primary Examiner* — William H. Mayo, III
*Assistant Examiner* — Rhadames Alonzo Miller
(74) *Attorney, Agent, or Firm* — IPUSA, PLLC

(57) ABSTRACT

The present invention is a resin composition including: a resin component; zinc oxide; and an acetic acid remover, wherein the resin component includes an ethylene-vinylacetate copolymer and a content of the ethylene-vinylacetate copolymer in the resin component is greater than or equal to 10% by mass, wherein the acetic acid remover is an acid acceptor, a nitrogen-containing aromatic heterocyclic compound having a mercapto group, or a combination thereof, and wherein a mass ratio of the zinc oxide to the ethylene-vinylacetate copolymer is greater than or equal to 0.06 and less than or equal to 0.20.

5 Claims, No Drawings

RESIN COMPOSITION AND ELECTRICAL CABLE

TECHNICAL FIELD

The present invention relates to a resin composition and an electrical cable. The present application is based on and claims priority to Japanese Patent Application No. 2017-083547, filed on Apr. 20, 2017, the entire contents of the Japanese Patent Application are hereby incorporated herein by reference.

BACKGROUND ART

Ethylene-vinylacetate copolymers (EVA) are used in resin coating layers of electrical cables in terms of mechanical properties such as tensile elongation and flexibility and cost. Such a resin coating layer is used to enhance heat resistance by performing electron-beam crosslinking. However, in a case in which a resin coating layer contains an EVA, there is an inconvenience that acetic acid is generated by electron-beam irradiation and, due to the effect of the acetic acid, color change of a conductor of an electrical cable occurs.

With respect to this inconvenience, it is considered to add, to an EVA-based resin composition, a specific amount of a resin component containing an acrylic ester and a C=O group (see Japanese Laid-open Patent Publication No. H7-94039).

PRIOR ART DOCUMENT

Patent Document

[Patent Document 1] Japanese Laid-open Patent Publication No. H7-94039

SUMMARY OF THE INVENTION

According to one aspect of the present invention, a resin composition includes: a resin component; zinc oxide; and an acetic acid remover, wherein the resin component includes an ethylene-vinyl acetate copolymer and a content of the ethylene-vinylacetate copolymer in the resin component is greater than or equal to 10% by mass, wherein the acetic acid remover is an acid acceptor, a nitrogen-containing aromatic heterocyclic compound having a mercapto group, or a combination thereof, and wherein a mass ratio of the zinc oxide to the ethylene-vinylacetate copolymer is greater than or equal to 0.06 and less than or equal to 0.20.

An electrical cable according to another aspect of the present invention is an electrical cable including a conductor and a resin coating layer around the conductor wherein the resin coating layer is formed of the resin composition.

Further, an electrical cable according to another aspect of the present invention is an electrical cable including a conductor and a resin coating layer around the conductor wherein the resin coating layer is formed of an electron-beam crosslinked body of the resin composition.

EMBODIMENT FOR CARRYING OUT THE INVENTION

Problem to be Solved by the Present Invention

In the conventional material described above, a discoloration of a conductor is not sufficiently suppressed, and there is a disadvantage that the tensile elongation of a resin composition changes greatly and becomes inappropriate.

In view of the above, the present invention has an object to provide a resin composition that is excellent in suppressing discoloration of a conductor while maintaining tensile elongation. Also, the present invention has an object to provide an electrical cable in which the discoloration of a conductor is suppressed by using this resin composition.

Effect of the Present Invention

According to the present invention, a resin composition is excellent in suppressing discoloration of a conductor while maintaining tensile elongation. According to the present invention, in an electrical cable, the discoloration of a conductor is suppressed.

DESCRIPTION OF EMBODIMENT OF THE PRESENT INVENTION

According to one embodiment of the present invention, a resin composition includes: a resin component; zinc oxide; and an acetic acid remover, wherein the resin component includes an ethylene-vinylacetate copolymer (which may be referred to as "EVA" hereinafter) and a content of the EVA in the resin component is greater than or equal to 10% by mass, wherein the acetic acid remover is an acid acceptor, a nitrogen-containing aromatic heterocyclic compound having a mercapto group, or a combination thereof, and wherein a mass ratio of the zinc oxide to the EVA is greater than or equal to 0.06 and less than or equal to 0.20.

The resin composition includes a resin component, which includes an EVA by a content in the range described above, zinc oxide, and, as an acetic acid remover, at least one of an acid acceptor and a nitrogen-containing aromatic heterocyclic compound having a mercapto group, and the mass ratio of the zinc oxide to the EVA is in the range described above. In the resin composition, by using zinc oxide, of which the amount is in a specific range with respect to an EVA, and the specific acetic acid remover described above in combination, even in a case where electron-beam crosslinking is performed on the resin composition including the EVA by the content described above, acetic acid generated from the EVA is considered to be able to be effectively removed, and as a result, the conductor discoloration property is excellent. In addition, the tensile elongation of the resin composition is maintained by the above described composition.

It is preferable that a mass ratio of the above described acetic acid remover to the above described zinc oxide is greater than or equal to 0.1 and less than or equal to 10. Thus, by setting the mass ratio of the acetic acid remover to zinc oxide in the above described range, the tensile elongation of the resin composition can be further maintained.

It is preferable that the above described acid acceptor is silica, hydrotalcite, magnesium oxide, magnesium hydroxide, aluminum hydroxide, or a combination thereof. Thus, by using the specific acid acceptor described above, it is possible to further enhance the conductor discoloration property of the resin composition.

As the above described nitrogen-containing aromatic heterocyclic compound having a mercapto group, a 2-mercaptoimidazole compound or a 2-mercaptothiazole compound is preferable. Thus, by using the specific compound described above, it is possible to further enhance the conductor discoloration property of the resin composition.

It is preferable that the above described resin component further includes a polyolefin. Such a polyolefin has excellent mechanical properties. Therefore, by blending the EVA with a polyolefin in the resin component, the mechanical properties of the resin composition can be further enhanced.

An electrical cable according to one aspect of the present invention is an electrical cable including: a conductor; and a resin coating layer around the conductor, wherein the resin coating layer is formed of the resin composition. An electrical cable according to one aspect of the present invention is an electrical cable including: a conductor; and a resin coating layer around the conductor, wherein the resin coating layer is formed of an electron-beam crosslinked body of the resin composition.

Because the electrical cable uses, for a resin coating layer, the resin composition described above or an electron-beam crosslinked body of the resin composition, the discoloration of a conductor is suppressed.

DETAILS OF EMBODIMENT OF THE PRESENT INVENTION

In the following, a resin composition and an electrical cable according to an embodiment of the present invention will be described in detail.

<Resin Composition>

A resin composition according to an embodiment of the present invention contains a resin component, zinc oxide, and an acetic acid remover. The resin composition may contain other components other than a resin component, zinc oxide and an acetic acid remover, to the extent not detracting effects of the present invention.

<Resin Component>

The resin component includes an EVA as described above. In addition to the EVA, the resin component may also contain other polymers.

(EVA)

The EVA is a random copolymer of ethylene and vinyl acetate. The EVA may include other monomeric units in addition to an ethylene unit and a vinyl acetate unit.

As a lower limit of the ethylene unit content percentage in the EVA, 60% by mass is preferable, 70% by mass is more preferable, and 80% by mass is further more preferable. As an upper limit of the above ethylene unit content percentage, 98% by mass is preferable, 95% by mass is more preferable, and 88% by mass is further more preferable.

As a lower limit of the vinyl acetate unit content percentage in the EVA, 2% by mass is preferable, 5% by mass is more preferable, and 12% by mass is further more preferable. As an upper limit of the above vinyl acetate unit content percentage, 40% by mass is preferable, 30% by mass is more preferable, and 20% by mass is further more preferable.

Examples of other monomer units include a unit derived from (meth)acrylic acid, a unit derived from (meth)acrylic ester, and the like. In a case in which the EVA includes other monomer units, as an upper limit of the content percentage of said other monomer units, 10% by mass is preferable, 5% by mass is more preferable, and 1% by mass is further more preferable.

Examples of commercially available products of the EVA include "ULTRASEN" of TOSOH CORPORATION, "EVAFLEX" of Du Pont-Mitsui Polychemicals Co., Ltd., "SUNTECH" of Asahi Kasei Corporation, and the like.

As a lower limit of the content of the EVA in the resin component, it is 10% by mass, 12% by mass is preferable, and 14% by mass is more preferable. By setting the content of the EVA in the above described range, the conductor discoloration suppression property of the resin composition can be further enhanced. When the content of the EVA is less than the lower limit described above, the tensile elongation of the resin composition may decrease.

(Other Polymers)

Examples of other polymers other than the EVA that may be included in the resin component of the resin composition include:

polyethylene such as low density polyethylene (LDPE) and high density polyethylene (HDPE), polypropylene, an ethylene-propylene copolymer, an ethylene-butene copolymer, an ethylene-octene copolymer, polymethylpentene (TPX), and a polyolefin such as an olefinic thermoplastic elastomer (TPO);

polystyrene;

a (meth) acrylic polymer such as poly (meth) acrylic acid, poly (meth) acrylic acid ester, and poly (meth) acrylonitrile; and a halogen polymer such as polyvinyl chloride, polyvinylidene chloride, and polytetrafluoroethylene.

As another polymer, a polyolefin is preferable, polyethylene is more preferable, and HDPE is further more preferable. By using the above described polymer as another polymer, mechanical properties of the resin composition can be further improved.

In a case in which the resin component includes another polymer, 10% by mass is preferable, 30% by mass is more preferable, and 50% by mass is further more preferable as a lower limit of the content of said another polymer. As an upper limit of the above content, 90% by mass is preferable, 80% by mass is more preferable, and 75% by mass is further more preferable.

[Zinc Oxide]

Zinc oxide is an oxide of zinc represented by the composition formula ZnO. As zinc oxide, one in a particulate form is usually used.

Zinc oxide can be obtained, for example, by a method of adding a reducing agent such as coke to a zinc ore and oxidizing zinc vapor generated by firing with air, by a method of using zinc sulfate or zinc chloride as a material, or the like. The method of manufacturing zinc oxide is not particularly limited, and may be any manufacturing method.

As a lower limit of the average particle diameter of zinc oxide, 0.1 μm is preferable and 0.5 μm is more preferable. As an upper limit of the average particle diameter, 6 μm is preferable and 4 μm is more preferable. By setting the average particle diameter of zinc oxide in the above described range, the dispersibility of zinc oxide in the resin composition can be further enhanced. The average particle diameter of zinc oxide can be measured by a laser light scattering method.

Examples of a commercially available product of zinc oxide include "zinc oxide (No. 1(JIS), No. 2(JIS), No. 3(JIS))" of Sakai Chemical Industry Co., Ltd., "zinc oxide (JIS1, JIS2, JIS3)" and "active zinc oxide" of HAKUSUI TECH CO., LTD.

As a lower limit of the mass ratio of zinc oxide to the EVA, it is 0.06, 0.07 is preferable, and 0.08 is more preferable. As an upper limit of the above mass ratio, it is 0.20, 0.18 is preferable, and 0.17 is more preferable. By setting the mass ratio of zinc oxide to the EVA in the above described range, the conductor discoloration suppression property of the resin composition can be further enhanced and the tensile elongation can be further maintained. When the mass ratio described above is less than the lower limit described above, the conductor discoloration suppression property of the resin composition may decrease. When the mass ratio described above exceeds the upper limit described above, the tensile elongation of the resin composition may decrease.

[Acetic Acid Remover]

The acetic acid remover is an acid acceptor, a nitrogen-containing aromatic heterocyclic compound having a mercapto group, or a combination thereof.

(Acid Acceptor)

An acid acceptor is a component that adsorbs acetic acid generated by decomposition of an EVA or the like. Examples of the acid acceptor include silica, hydrotalcite, magnesium oxide, magnesium hydroxide, aluminum hydroxide, and the like. As the acid acceptor, one in a particulate form is usually used. For the acid acceptor, one kind may be used alone or two or more kinds may be used in combination.

Silica is a component that is represented by the composition formula $SiO_2$. Silica may be natural silica such as quartz powder or silica powder; anhydrous silicic acid such as silica gel; synthetic silica such as hydrous silicic acid, or the like. Among these, synthetic silica is preferable.

Examples of a commercially available product of silica include "AEROSIL (50, 200, 380)" of NIPPON AEROSIL CO., LTD and "WACKER HDK (S13, V15, N20)" of Asahi Kasei Corporation.

Hydrotalcite is $[M1_a M2_b M3_y (OH)_2{}^{x+}{}_{3y-2}]\ A^{n-}{}_{y/n} \cdot wH_2O$ (M1 is Mg, Ca, Sr, Ba, or a combination of these. Also, M2 is Zn, Cd, Pb, Sn, or a combination of these. Also, M3 is a trivalent metal. Also, $A^{n-}$ is an n-valent anion. Also, a and b are independently integers from 0 to 10. Also, x is an integer from 1 to 10. Also, y is an integer from 1 to 5. Also, w is an integer greater than or equal to 1. Note that it is a component where a+b=x and 2x+3y=4 are satisfied).

Examples of a commercially available product of hydrotalsite include "MAGCELER1" and "ALCAMIZER (1, 2, P93, P93-2, 5)" of Kyowa Chemical Industry Co., Ltd., and "STABIACE (HT-1, HT-7, HT-P)" of Sakai Chemical Industry Co., Ltd.

Magnesium oxide is a component that is represented by the formula MgO. Examples of a commercially available product of magnesium oxide include "UC (95S, 95M, 95H)" of Ube Material Industries, Ltd., "STARMAG (U, U2, CX, M, L, P, G, PSF) of Konoshima Chemical Co., Ltd., "Kyowamag (150, 30, MF-150, MF-30) of Kyowa Chemical Industry Co., Ltd, and the like.

Magnesium hydroxide is a component that is represented by the composition formula $Mg(OH)_2$. Examples of a commercially available product of magnesium hydroxide include "MAGSTAR (#2, #4, #5)" and "Echomag (10, PZ-1)" of Tateho Chemical Industry Co., Ltd, and the like.

Aluminum hydroxide is a component that is represented by the composition formula $Al(OH)_3$. Examples of a commercially available product of aluminum hydroxide include "C-303", "C-301N", and "C-300GT" of Sumitomo Chemical Company, Limited, "HIGILITE (H-42, H-43)" of Showa Denko K.K., and the like.

As a lower limit of the average particle diameter of the acid acceptor, 0.01 μm is preferable, 0.02 μm is more preferable, and 0.03 μm is further more preferable. As an upper limit of the above described average particle diameter, 20 μm is preferable, 10 μm is more preferable, and 5 μm is further more preferable. By setting the average particle diameter of the acid acceptor in the above described range, the dispersibility in the resin composition can be further enhanced, and as a result, the conductor discoloration suppression property can be further enhanced. The average particle diameter of the acid acceptor can be measured by a laser light scattering method.

As the acid acceptor, silica, hydrotalcite, magnesium oxide, magnesium hydroxide, and aluminum hydroxide are preferable, and silica is more preferable.

(Nitrogen-Containing Aromatic Heterocyclic Compound Having Mercapto Group)

The nitrogen-containing aromatic heterocycle compound having a mercapto group (hereinafter referred to as "compound (A)") is a compound having a mercapto group and a nitrogen-containing aromatic heterocycle.

Examples of the nitrogen-containing aromatic heterocycle include an imidazole ring, a thiazole ring, an isothiazole ring, an oxazole ring, an isoxazole ring, a pyrrole ring, a pyrazole ring, a pyridine ring, a pyrazine ring, a pyrimidine ring, a pyridazine ring and a ring where an aromatic ring, such as a benzene ring or a naphthalene ring, is condensed to these rings. Among these, an imidazole ring, a benzimidazole ring, a thiazole ring, and a benzothiazole ring are preferable.

As the compound (A), one in which a mercapto group is coupled to a carbon atom (position 2) adjacent to a nitrogen atom of a nitrogen-containing aromatic heterocycle is preferable. According to such a compound A, by having a structure of N=C—SH, the removability of acetic acid can be enhanced, and as a result, the conductor discoloration suppression property of the resin composition can be further enhanced.

Examples of (A) include:

2-mercaptoimidazole compounds such as 2-mercaptobenzimidazole, methyl substituted 2-mercaptomethylbenzimidazole, and 2-mercaptoimidazole; and 2-mercaptothiazole compounds such as 2-mercaptobenzothiazole, methyl substituted 2-mercaptothiazole, and 2-mercaptothiazole.

As the compound (A), a 2-mercaptoimidazole compound and a 2-mercaptothiazole compound are preferable, and a 2-mercaptobenzimidazole is more preferable.

As a lower limit of the mass ratio of the acetic acid remover to the zinc oxide, 0.1 is preferable, 0.3 is more preferable, and 0.5 is further more preferable. As an upper limit of the above described mass ratio, 10 is preferable, 8 is more preferable, and 7 is further more preferable. By setting the mass ratio of the acetic acid remover to zinc oxide in the above described range, the conductor discoloration suppression property of the resin composition can be further enhanced and the tensile elongation can be further maintained.

[Other Components]

As needed, the resin composition may contain, as other components, a flame retardant, an antiaging agent, a lubricant, a coloring agent, a crosslinking agent, a processing stabilizer, a heavy metal deactivating agent, a foaming agent, multifunctional monomers, an organic peroxide, and the like, as appropriate. As an upper limit of the content of the other components, 50% by mass is preferable and 30% by mass is more preferable.

The resin composition can be prepared by mixing the resin component, zinc oxide, the acetic acid remover and, as needed other components, by a mixer such as an open roll, a pressure kneader, a single axis mixer, or a biaxial mixer.

[Use]

Because the resin composition is excellent in suppressing the conductor discoloration and maintains tensile elongation, the resin composition can be preferably used as a material for a resin coating layer of an electrical cable, for example.

<Electrical Cable>

Hereinafter, the electrical cable will be described. The electrical cable includes a conductor and a resin coating layer around the conductor. The resin coating layer is formed of the resin composition described above or an electron-beam crosslinked body of the resin composition.

(Conductor)

The material and the configuration of the conductor are not particularly limited. As the conductor, various materials can be used such as a copper wire, a copper alloy wire, a tin-plated copper wire, an aluminum wire, an aluminum alloy wire, a steel core aluminum wire, a copper flywire, an nickel-plated copper wire, a silver-plated a copper wire, and a copper-coated aluminum wire. Among these, in a case in which the conductor includes copper such as a copper wire, a copper alloy wire, a tin-plated copper wire, a nickel-plated copper wire, a silver-plated copper wire, or a copper-coated aluminum wire, the advantage of using the resin composition that is excellent in suppressing the conductor discoloration as described above is particularly large.

(Resin Coating Layer)

The resin coating layer is disposed around the conductor and is formed of the resin composition described above or an electron-beam crosslinked body of the resin composition described above.

In the electrical cable, in a case where the resin coating layer is formed of the resin composition or in a case where the resin coating layer uses the resin composition and is formed by irradiation of an electron-beam, by an excellent conductor discoloration suppression property of the resin composition, the discoloration of the conductor is effectively suppressed.

EXAMPLES

In the following, although the present invention will be specifically described with reference to examples, the present invention is not limited to the following examples.

The details of each of the components used in Test Examples are as follows.

[Resin Component]

EVA: "ULTRASEN 6M51A" (the content percentage of vinyl acetate unit is 15% by mass and the density is 0.94 g/cm$^3$) of TOSOH CORPORATION HDPE: "HI-ZEX 5305E" of Prime Polymer Co., Ltd.

[Zinc Oxide]

"zinc oxide No. 1(JIS)" of Sakai Chemical Industry Co., Ltd.

[Acetic Acid Remover]

(Acid Acceptor)

Silica: "AEROSIL 200V" of NIPPON AEROSIL CO., LTD. (Compound (A))

"SUMILIZER MB" of Sumitomo Chemical Company, Limited

[Other Components]

Flame Retardant)

1,2-bis(2,3,4,5,6-pentabromophenyl)ethane: "SAYTEX8010" of Albemarle Corporation Antimony trioxide: "PATOX-M" of NIHON SEIKO CO., LTD.

(Antiaging Agent)

"Irganox 1010" of BASF SE (Lubricant)

stearic acid: "STEARIN" of NOF CORPORATION (Crosslinking Agent)

"TD1500s" of DIC Corporation

Test Examples 1 to 16

Using a kneader, resin compositions were prepared by being mixed such that blended compositions indicated in Table 1 were obtained.

[Evaluation]

The obtained resin compositions in Test Examples 1 to 16 were evaluated as follows.

(Conductor Discoloration Suppression Property)

On a conductor (material: copper alloy (Cu-0.3 wt. % Sn), number of strands: 60, and strand diameter: 0.08 mm), the prepared resin composition described above was extruded/coated, such that the outer diameter of the electrical cable was 1.45 mm. Thereafter, it was crosslinked by electron-beam irradiation of 180 kGy to prepare the electrical cable. The obtained electrical cable was maintained at 70° C. and 85% humidity for 24 hours. After extracting it, the resin coating layer was removed to check the appearance of the conductor and evaluate the conductor discoloration suppression property. The conductor discoloration suppression property was evaluated as "A (good)" when a black portion could not be identified, and as "B (bad)" when a black portion could be identified.

(Tensile Elongation)

With respect to resin coating layers of the electrical cables obtained as described above, a tensile test was performed in accordance with JASO D618. The tensile elongation can be evaluated as "good" when it is greater than or equal to 300% and "bad" when it is less than 300%.

TABLE 1

| | TEST EXAMPLE | | | 1 | 2 | 3 | 4 | 5 | 6 | 7 | 8 |
|---|---|---|---|---|---|---|---|---|---|---|---|
| BLENDED AMOUNT (PART BY MASS) | RESIN COMPONENT | HDPE | HI-ZEX 5305E | 70 | 70 | 70 | 70 | 70 | 70 | 70 | 70 |
| | | EVA | ULTRASEN 6M51A | 30 | 30 | 30 | 30 | 30 | 30 | 30 | 30 |
| | ZINC OXIDE | | ZINC OXIDE No. 1(JIS) | 0 | 5 | 1.5 | 2 | 0 | 2 | 2 | 0 |
| | ACETIC ACID REMOVER | ACID ACCEPTOR | AEROSIL 200V | 0 | 7.5 | 7.5 | 7.5 | 7.5 | 0 | 1.5 | 8 |
| | | COMPOUND (A) | SUMILIZER MB | 0 | 1.5 | 1.5 | 1.5 | 1.5 | 1.5 | 0 | 2 |

TABLE 1-continued

| | | | | | | | | | | | |
|---|---|---|---|---|---|---|---|---|---|---|---|
| | OTHER COMPONENTS | FLAME RETARDANT | SAYTEX8010 | 25 | 25 | 25 | 25 | 25 | 25 | 25 | 25 |
| | | | PATOX-M | 12.5 | 12.5 | 12.5 | 12.5 | 12.5 | 12.5 | 12.5 | 12.5 |
| | | ANTIAGING AGENT | Irganox 1010 | 2 | 2 | 2 | 2 | 2 | 2 | 2 | 2 |
| | | LUBRICANT | STEARIN | 0.5 | 0.5 | 0.5 | 0.5 | 0.5 | 0.5 | 0.5 | 0.5 |
| | | CROSSLINKING AGENT | TD1500s | 0.5 | 0.5 | 0.5 | 0.5 | 0.5 | 0.5 | 0.5 | 0.5 |
| | MASS RATIO OF ZINC OXIDE TO EVA | | | 0 | 0.17 | 0.05 | 0.07 | 0 | 0.07 | 0.07 | 0 |
| | EVALUATION RESULT | | DISCOLORATION SUPPRESSION PROPERTY | B | A | B | A | B | A | A | B |
| | | | TENSILE ELONGATION | 490 | 335 | 380 | 350 | 435 | 480 | 475 | 290 |

| | | | TEST EXAMPLE | 9 | 10 | 11 | 12 | 13 | 14 | 15 | 16 |
|---|---|---|---|---|---|---|---|---|---|---|---|
| BLENDED AMOUNT (PART BY MASS) | RESIN COMPONENT | HDPE | HI-ZEX 5305E | 70 | 70 | 70 | 70 | 91 | 40 | 40 | 40 |
| | | EVA | ULTRASEN 6M51A | 30 | 30 | 30 | 30 | 9 | 60 | 60 | 60 |
| | ZINC OXIDE | | ZINC OXIDE No. 1(JIS) | 10 | 10 | 5 | 5 | 0 | 0 | 5 | 5 |
| | ACETIC ACID REMOVER | ACID ACCEPTOR | AEROSIL 200V | 0 | 7.5 | 0 | 3 | 0 | 0 | 0 | 3 |
| | | COMPOUND (A) | SUMILIZER MB | 0 | 1.5 | 3 | 0 | 0 | 0 | 3 | 0 |
| | OTHER COMPONENTS | FLAME RETARDANT | SAYTEX8010 | 25 | 25 | 25 | 25 | 25 | 25 | 25 | 25 |
| | | | PATOX-M | 12.5 | 12.5 | 12.5 | 12.5 | 12.5 | 12.5 | 12.5 | 12.5 |
| | | ANTIAGING AGENT | Irganox 1010 | 2 | 2 | 2 | 2 | 2 | 2 | 2 | 2 |
| | | LUBRICANT | STEARIN | 0.5 | 0.5 | 0.5 | 0.5 | 0.5 | 0.5 | 0.5 | 0.5 |
| | | CROSSLINKING AGENT | TD1500s | 0.5 | 0.5 | 0.5 | 0.5 | 0.5 | 0.5 | 0.5 | 0.5 |
| | MASS RATIO OF ZINC OXIDE TO EVA | | | 0.33 | 0.33 | 0.17 | 0.17 | 0 | 0 | 0.08 | 0.08 |
| | EVALUATION RESULT | | DISCOLORATION SUPPRESSION PROPERTY | B | A | A | A | A | B | A | A |
| | | | TENSILE ELONGATION | 295 | 250 | 470 | 470 | 510 | 520 | 490 | 485 |

From the results of Table 1 above, it can be seen that the resin compositions of Test Examples Nos. 2, 4, 6, 7, 11, 12, 15, and 16 having a specific configuration described above are excellent in suppressing the conductor discoloration and maintain tensile elongation.

Conversely, it can be seen that in the resin compositions of Test Examples Nos. 1, 3, 5, 8, 9, 10, and 14, which do not satisfy a configuration described above, at least one of the conductor discoloration suppression property and the tensile elongation decreases. Note that the resin composition of Test Example No. 13 is excellent in the conductor discoloration suppression property because the content of the EVA is smaller than the value described above.

The scope of the present invention is indicated by claims rather than meanings described above and is intended to include all changes within the meanings and the scope of equivalence with the claims.

The invention claimed is:

1. A resin composition comprising:
a resin component;
zinc oxide; and
an acetic acid remover,
wherein the resin component includes an ethylene-vinylacetate copolymer and a content of the ethylene-vinylacetate copolymer in the resin component is greater than or equal to 10% by mass,
wherein the resin component includes high-density polyethylene and a content of the high-density polyethylene is greater than or equal to 30 parts by mass and less than or equal to 75 parts by mass with respect to 100 parts by mass of the resin component,
wherein the acetic acid remover is an acid acceptor, a nitrogen-containing aromatic heterocyclic compound having a mercapto group, or a combination thereof,
wherein a mass ratio of the zinc oxide to the ethylene-vinylacetate copolymer is greater than or equal to 0.06 and less than or equal to 0.20, and
wherein a mass ratio of the acetic acid remover to the zinc oxide is greater than or equal to 0.1 and less than or equal to 10.

2. The resin composition according to claim 1, wherein the acid acceptor is silica, hydrotalcite, magnesium oxide, magnesium hydroxide, aluminum hydroxide, or a combination thereof.

3. The resin composition according to claim 1, wherein the nitrogen-containing aromatic heterocyclic compound having the mercapto group is a 2-mercaptoimidazole compound or a 2-mercaptothiazole compound.

4. An electrical cable comprising
a conductor; and
a resin coating layer around the conductor,
wherein the resin coating layer is formed of the resin composition according to claim 1.

5. An electrical cable comprising:
a conductor; and
a resin coating layer around the conductor,
wherein the resin coating layer is formed of an electron-beam crosslinked body of the resin composition according to claim 1.

* * * * *